Aug. 21, 1934.　　　　　F. H. LAMB　　　　　1,970,756
TRACTION BELT AND SHOE
Filed Dec. 11, 1931　　　2 Sheets-Sheet 1
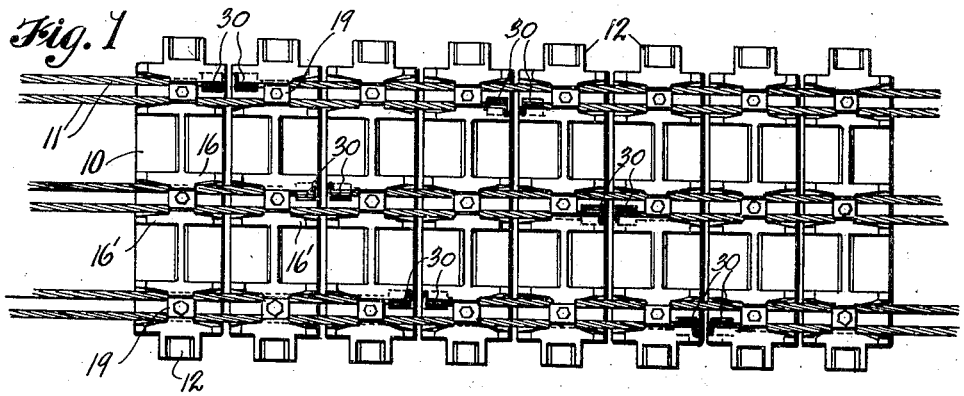
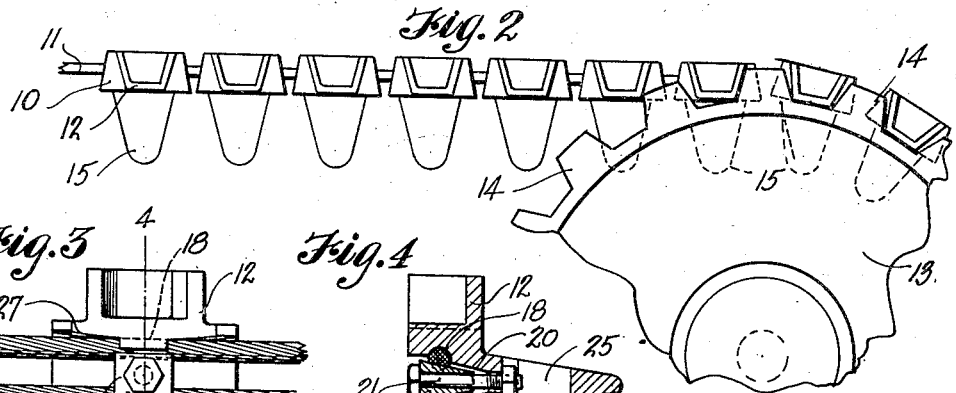
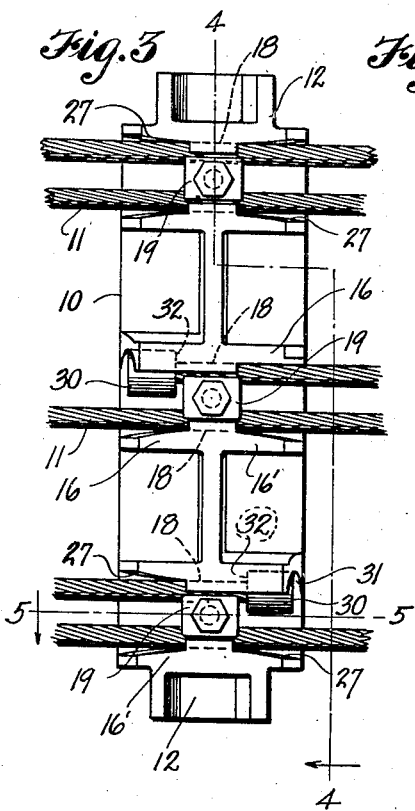
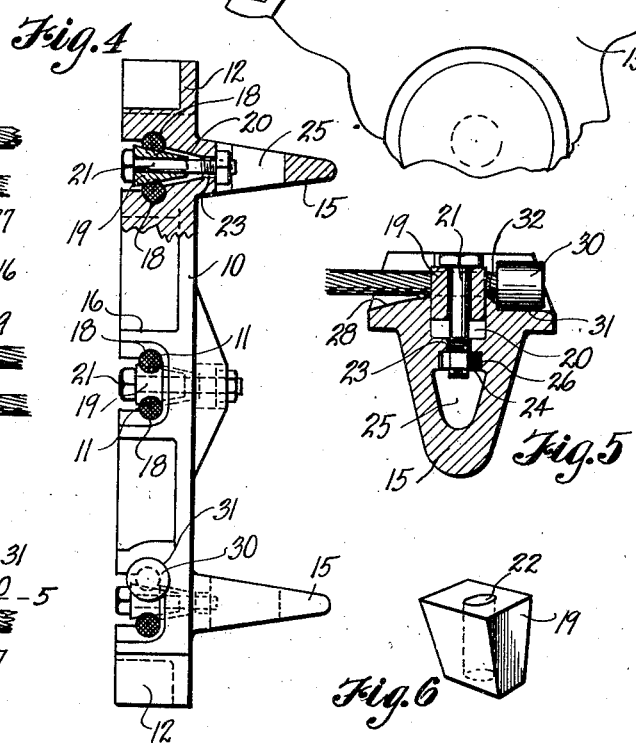
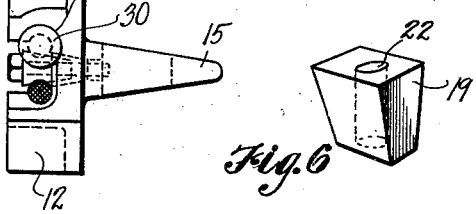
INVENTOR
FRANK H. LAMB
BY Cook & Robinson
ATTORNEY Aug. 21, 1934.  F. H. LAMB  1,970,756
TRACTION BELT AND SHOE
Filed Dec. 11, 1931  2 Sheets-Sheet 2

INVENTOR
FRANK H. LAMB
BY Cook & Robinson
ATTORNEY

Patented Aug. 21, 1934

1,970,756

UNITED STATES PATENT OFFICE 1,970,756

TRACTION BELT AND SHOE

Frank H. Lamb, Hoquiam, Wash.

Application December 11, 1931, Serial No. 580,402

5 Claims. (Cl. 305—10)

This invention relates to tractors, or the like, and more particularly to improvements in track construction as employed by tractors of the track laying type; it being the principle object of the present invention to provide a light and flexible track that is free of working bearings, which affords positive traction in either soft or hard surfaces, which does not lengthen in pitch incident to use and is comparatively inexpensive both in the original cost of manufacture and in upkeep.

More specifically stated, the objects of the present invention are to be found in the provision of a track construction of the above character consisting of a continuous traction belt made up of closely assembled, one piece traction producing shoes of novel construction, joined hingedly together by a plurality of wire strand ropes or cables which extend lengthwise of the belt; the shoes being hingedly joined by the cables and secured to the latter by the co-action of cable guiding lugs on the shoes and wedges applied in a manner to clamp and hold the cables securely in seats provided therefor in the lugs.

Another object of the invention resides in the details of construction of the traction shoes especially with reference to their one piece construction and their being provided with cable guide lugs and the cable holding wedges that cooperate therewith; also in the novel manner of applying and securing the wedges to hold the shoes against slippage on the cables and to provide for an automatic self tightening of the wedges incident to use of the belt.

Another object of the invention is to provide a novel means for positively securing the ends of the cables in the track and in a manner which permits of their easy disconnection when such is desired for repair or replacement of parts.

Still another object of the invention resides in the provision of an improved cable gripping and holding means that is suitable for the above or for other uses.

Other objects of the invention reside in the details of construction of the various parts, their combination and mode of operation, as will hereinafter be fully described.

In accomplishing these objects I have provided the improved details of construction, the preferred forms of which are illustrated in the accompanying drawings, wherein—

Fig. 1 is a plan view of a portion of a track embodying the present invention; this view showing the ground engaging or traction surfaces of the track.

Fig. 2 is a side view of the track, showing a portion of a driving and supporting wheel about which the track may operate.

Fig. 3 is a face view of one of the traction shoes, illustrating in particular the shape, location and relationship of the cable guide lugs and the cable gripping wedges.

Fig. 4 is a longitudinal view of the shoe, taken on the line 4—4 in Fig. 3.

Fig. 5 is a cross section on the line 5—5 in Fig. 3.

Fig. 6 is a perspective view of one of the cable gripping wedges.

Figure 7:
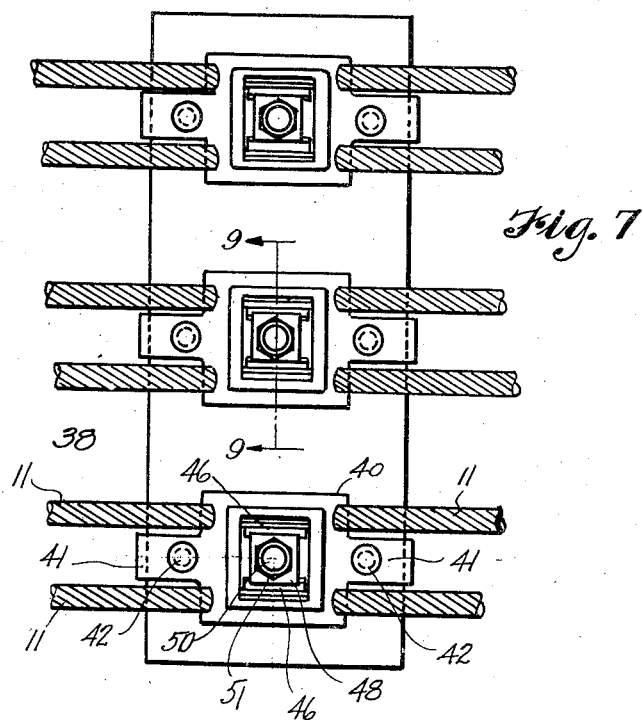
Fig. 7 is a plan view of a track shoe of an alternative form of construction.

Referring more in detail to the drawings:

Tracks of the present character are in the form of endless belts and generally are mounted for travel upon suitable supporting guides and about driving and guiding wheels so that the lower horizontal run of the belt provides an extended traction producing support for the tractor.

In Fig. 1 is shown a short section of the track belt embodied by the present invention and in Fig. 2 the track is shown as associated with a supporting and driving wheel but since the various guiding and driving devices form no material part of the present invention, they have not otherwise been illustrated. However, it is to be understood that any of the usual belt guiding or supporting means could be used so long as it was suitable to the construction details of the present belt construction.

The track belt shown is made up of a plurality of transversely disposed traction shoes 10, of the same size and construction, except as later specified, and slightly spaced so as not to interfere with each other in use, and thereby to afford additional traction, and these shoes are functionally secured together in a continuous belt like form by a plurality of wire strand ropes or cables 11 which extend lengthwise of the track.

Each shoe, in that form of construction illustrated in Figs. 1 to 6, consists of a metal casting of rectangular outline, formed at its opposite ends with symmetrically disposed lugs 12 adapted to engage between the teeth, or sprockets, of a guiding and supporting wheel over which the belt would extend. Such a wheel is designated at 13 in Fig. 2 and its sprockets are designated by numeral 14.

On the inner face of each shoe, and near its opposite ends are extended, tapered lugs 15 designed to serve as guiding and retaining means and which engage with the various driving and guiding devices, about which the track operates, to retain the track against lateral displacement. In some instances these lugs might be used in connection with a wheel arranged with openings to receive them, as means for driving the belt. However, in the present instance they are intended only as retaining and guiding means for holding the belt in place on the supports, especially across the lower run where the track is in contact with the ground surfaces and where lateral strain and pressure are apt to be exerted.

In the present form of construction, the cables 11 which join the shoes together are arranged in pairs, and three pairs of cables are here employed; it being understood however that the number of cables employed in a track would be dependent to a great extent upon the width of the track, the strength and size of the cables and the load which they must be capable of withstanding. In some instances it might be desirable to employ but two pairs of cables, and in other instances three or more pairs. In some special instances it would be possible to use but one central pair.

When three pairs of cables are used, as in the present illustration, each of the track shoes is provided on its traction face, near its opposite ends and medially thereof, with spaced apart and transversely extending cable guide lugs 16—16' for each set of cables; each pair of lugs providing between them, and across the top of the shoe, a passageway of sufficient width to contain therein a pair of the cables in spaced relation, as shown in Figs. 1 and 3. The paired lugs 16—16' are formed on their inner faces, and midway between the opposite longitudinal edges of the shoe, with opposedly disposed and inwardly facing seats 18 within which the paired cables, respectively are seated and are held against slippage or displacement from the seats by the pressure thereagainst of a wedge block 19. Each wedge is inserted between the lugs and between the cables to clamp the latter against the seats of the lugs. As illustrated in detail in Figs. 4 and 5, there are cored out sockets 20 in the shoe directly between the paired lugs to receive the inner end of the wedge, and these sockets are sufficiently deep that they will not interfere with the necessary inward adjustment of the wedges between the cables to the extent necessary to effectively grip and hold the cables. When the wedges have been inserted in clamping position between the cables, they are tightened and held in place by means of bolts 21 that extend inwardly through openings 22 provided in the wedge and through holes 23 in the bottom walls of the sockets, and nuts 24 are threaded onto the inner ends of the bolts to draw the wedges in and hold them in place. It will be observed by reference to Fig. 5 that the heads of the wedge holding bolts are substantially even with, or slightly within the outer surfaces of the lugs and the nuts at the inner ends are enclosed within the guide lugs on the inner face of the shoe; these lugs being provided with transverse passages 25 for applying nuts to the bolt ends. The nuts preferably are seated in sockets 26 to prevent their unthreading. Manifestly, with the parts so assembled, tightening of the bolts in the nuts will draw the wedges down between the cables and a wedging force or pressure may be exerted that will be sufficient to positively and securely hold the shoes against slippage on the cables.

A very important detail of the shoe construction is that which prevents wear, kinking or breaking of the strands of the cables by reason of their connection with the shoes. It is to be understood that the present belt track is of a flexible character and in passing over the various guiding and supporting wheels, it is required at times to make short bends and turns, and since the cables are at times placed under considerable strain, especially when heavy loads are being drawn over rough and uneven surfaces, it is desirable to avoid drawing the cables sharply across any edge or corner that might cause wearing or kinking of the strands.

This detail of construction is best shown in Fig. 3. This shows the inner surfaces of the lugs 16—16' as rounded or curved outwardly and away from the cable from the ends of the cable seats to the side edges of the shoe as at 27. It will also be observed, by reference to Fig. 5, that the base surface of the passageway between the lugs is rounded or curved away from the cable at the opposite sides of the cable seats, as seen at 28. This curving of the surfaces of the lugs provides that normally the cables are in direct contact with the shoe only at the seats provided therefor in the lugs, and when they are flexed or bent laterally or downwardly, they will rest against smoothly curved surfaces.

Another novel feature of the track construction resides in the means and method of attaching the cable ends to the track so as to provide a substantial and secure anchorage, yet to permit disconnection of the cable from the shoe when such is required, or desired. It will be understood that each of the cables is of substantially the circumferential length of the track and is provided at its ends with ferrules 30 of greater diameter than the cable. These ferrules are suitably and securely attached to the cable ends so that they cannot possibly pull loose. Adjacent shoes of the track are provided at adjacent edges with seats or sockets 31 into which the ferrules may be drawn and seated in a holding connection. In Fig. 5 one of these seats 31 has been shown in detail and it is formed partly within an end portion of the lug 16 and partly within the base wall of the shoe between the lugs and it provides for snugly receiving the ferrules, and also providing a shoulder 32 with which the inner end of the ferrule engages. Where a plurality of cables are used, as in the present instance the ends of the cables would be arranged in staggered relation or at spaced intervals lengthwise of the track so that not more than one of the cables would be ineffective at any point.

Figure 8:
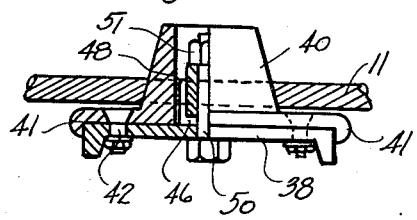
Fig. 8 is an end and partial cross sectional view of a shoe.
Figure 9:
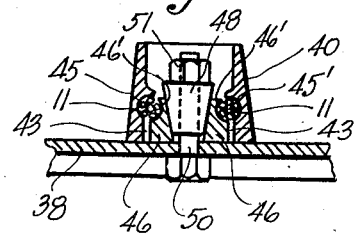
Fig. 9 is a cross sectional detail taken on the line 9—9 in Fig. 7.

In the alternative construction illustrated in Figs. 7, 8 and 9, the shoe consists of a flat rolled face section 38 to which gripping lugs 40 are applied on the inner face for attaching to the cables. These lugs extend transversely of the shoes in the direction of the cables and each is provided at its ends with flanges 41 which hook over the edges of the shoe and bolts 42 are extended through these flanges and through the shoe to hold the lugs securely in place. Each of the lugs is provided with a passage 43 therethrough for the cables and this passage opens to the underside of the lug and the cables are seated in the passage before the lug is secured to the shoe. Within the passage the lug is formed with seats 45—45' for the cables, and gripping blocks 46 are placed against the cables in opposed relation to the seats 45—45'. These gripping blocks are provided with seats 46' that are shaped to the curvature of the cables so that there will not be a tendency to cut or crease the cable when the blocks are wedged thereagainst, and wedges 48 are applied between the gripping blocks to hold the cables as in the devices previously described. Each of these wedges when disposed between the gripping blocks, is held in place by a bolt 50 which extends through the shoe and through the wedge and is drawn tightly into place by tightening of a nut 51 on the bolt. The surfaces of the wedge blocks, as shown, are tapered in accordance with the taper of the wedges so that substantial bearing surfaces is provided.

With the track so constructed it is apparent that it will be of a flexible character by reason of the universal flexibility of the cables and because of the spacing apart of the points of connection with the shoes. Furthermore, it is a track of extreme lightness as compared to the usual form of hinged shoe construction and it is entirely free of working bearings and joints that will wear and cause change in pitch of the track belt. The strength of the track will be in accordance with the strength of the several cables which join the shoes together and the provision of lugs on the outer surfaces of the shoes will give all the traction that is necessary for a track of this character.

There is also the advantage that the cables may be replaced if necessary. Also shoes may be replaced and without dismounting of the track and all of these features are advantageous to high speed operation.

Having thus described my invention, what I claim as new therein and desire to secure by Letters Patent is—

1. A belt track comprising a plurality of cables extending lengthwise of the belt in pairs, traction shoes applied to the cables transversely thereof and having cable guiding lugs thereon forming passageways transversely across the shoes for the paired cables; said lugs having opposedly facing seats in their inner surfaces against which the cables are applied, sockets in the shoes between the lugs, wedges applied between paired cables and extended into said sockets and engaging the cables in opposed relation to the said seats, bolts extended through the wedges and shoes, and nuts on the bolts for drawing the wedges into holding contact with the cables.

2. A belt track comprising cables extended lengthwise thereof in paired relation, traction shoes applied to the cables transversely thereof and having cable guiding lugs thereon in spaced relation and providing passageways across the ground engaging surfaces of the shoes for containing paired cables, said lugs having opposedly facing seats formed therein medially of the ends of the passageways to which the cables are applied and wedges applied to the shoes between the cables to cooperate with the seats to grip the cables and hold the shoe against slippage thereon; the cable passageways between the lugs having their surfaces curved from the seats outwardly away from the cables to permit rocking action of the shoes on the cables.

3. A traction belt comprising a plurality of longitudinally extending cables, traction shoes applied thereto having open channels across their traction surfaces within which the cables extend directly across the shoes, outset seats of short extent formed at transversely opposite points on the side walls of the channels against which the cables are disposed and wedges applied to the shoes between the seats to clamp the cables within the seats.

4. A traction belt comprising paired, longitudinally extending cables, traction shoes applied to the cables transversely thereof; said shoes having outwardly opening channels directly across the traction surfaces thereof through which the cables extend without deflection, outset seats formed on the opposite side walls of the channels medially of their ends against which the paired cables, respectively, are seated and whereby they are held normally clear of the channel walls except at the seating points, and wedges applied to the shoes between paired seats and cables to clamp the cables to the seats in a holding connection.

5. A shoe for endless belt tracks having traction lugs on its outer surface spaced to provide an open channel between them for direct passage of a pair of shoe connecting cables; said lugs having relative short cable seats formed thereon and facing toward each other within the channel medially of its ends and outset to retain the cables normally free of the walls of the channel at opposite sides of the seats, and a wedge applied to the shoe between the seats to clamp the cables thereagainst.

FRANK H. LAMB.